United States Patent [19]

Policka

[11] Patent Number: 4,589,211

[45] Date of Patent: May 20, 1986

[54] PANELING TEMPLATE

[76] Inventor: Stanley J. Policka, 5145 S. Martin Rd., Muskegon, Mich. 49441

[21] Appl. No.: 711,358

[22] Filed: Mar. 13, 1985

[51] Int. Cl.⁴ .......................... G01B 3/14; B25H 7/04

[52] U.S. Cl. .......................... 33/189; 33/562; 33/DIG. 10

[58] Field of Search .......................... 33/180 R, 189, 528, 33/562, DIG. 10

[56] References Cited

U.S. PATENT DOCUMENTS

| | | | |
|---|---|---|---|
| 2,887,776 | 5/1959 | Eisner | 33/189 |
| 2,898,688 | 8/1959 | Cottar | 33/189 |
| 3,116,563 | 1/1964 | Gelbman | 33/DIG. 10 |
| 3,123,918 | 3/1964 | Crabtree | 33/180 R |
| 3,733,707 | 5/1973 | Nix | 33/197 |
| 3,745,664 | 7/1973 | Altseimer | 33/DIG. 10 |
| 3,823,754 | 7/1974 | Nix | 33/DIG. 10 |
| 3,888,013 | 6/1975 | Benoit | 33/180 R |
| 3,913,235 | 10/1975 | Tenneson et al. | 33/174 G |
| 3,924,331 | 12/1975 | Goosen | 33/DIG. 10 |
| 4,259,785 | 4/1981 | Wortham | 33/DIG. 10 |
| 4,338,724 | 7/1982 | Johnson | 33/174 G |
| 4,339,973 | 7/1982 | Lawrence | 33/DIG. 10 |

*Primary Examiner*—Richard R. Stearns
*Attorney, Agent, or Firm*—John A. Waters

[57] ABSTRACT

A paneling template for marking the position of an electrical outlet box on the back side of a wall panel comprising a rectangular base, four posts with felt tips extending outwardly from the corners of the base, an electrical switch opening for a toggle switch in the middle of the base, prongs for attaching the template to an electrical receptacle extending from the inner side of the base, and screw apertures in the base that mate with switch plate screw openings in an electrical switch. The template is integrally formed of non-conductive, plastic resin, with the prongs being sufficiently flexible and resilient to permit the prongs to be bent over and out of the way so that the template can be positioned flush against the wall over an electrical switch.

4 Claims, 7 Drawing Figures

PANELING TEMPLATE

BACKGROUND OF THE INVENTION

This invention relates to a template for marking on the reverse side of wall paneling the location of electrical outlet boxes.

When wall paneling is installed in a building, an access hole must be cut in the individual panels to accommodate electrical outlet boxes. These outlet boxes can contain either electrical switches or electrical plug receptacles, and can be of varying sizes. Measuring the location of the electrical box on the wall and then attempting to make the access hole in the paneling using these measurements is difficult, time-consuming, and error prone, and can lead to ruined panels with holes cut at the wrong locations.

Various templates have been developed in an attempt to facilitate placing the access holes accurately in panelling. Some of the templates are designed to be positioned and held securely in an electrical outlet box by means of flexible legs which frictionally engage the inner sides of the electrical outlet box. However, these templates can not be used in all applications because electrical boxes vary in size. Also, they cannot be used where multiple plugs or outlets or switches are mounted in an enclosed box.

Other templates are designed to be used for an electrical switch or an electrical receptacle, but not both. Still others can be used with either type of electrical outlet box, but due to the means of making the template accommodate both types of boxes, the template is raised off the wall a considerable distance, thus decreasing the accuracy of the placement of the access hole as marked by the template. Still other templates cannot be used where either the switch or receptacle is present in the box, such as where the panels are being installed in connection with remodeling.

In some templates, the template marks the position of the electrical outlet box using either punch studs or a stamp for transmitting the outline of the box to the panel. The templates employing punch studs must be made of a heavy, sturdy metal in order to withstand the hammer blows necessary to imprint the position of the studs on the reverse side of the panels. The templates employing an outline of the box must be inked and pressure must be applied on the panel to the entire template in order to transmit to the reverse side of the panel the full outline of the box. Further, due to the large area to be inked, ink tends to be distributed to hands and other articles which are not meant to be inked.

SUMMARY OF THE INVENTION

The present invention is a rectangular template that is designed to fit accurately on different sized electrical outlet boxes containing either a switch or receptacle assembly. The outer surface of the template has protrusions in the form of posts located in each corner, each post having a marking tip thereof desirably formed of felt or the like to receive a marking medium such as chalk or ink. The posts form the outline of the outlet box. Flexible prongs extend inwardly from the inner surface and are insertable into the plug slots of an electrical receptacle. Alternatively, the prongs can be bent over when the template is used with an electrical switch, and the template is fastened by screws to the switch plate screw openings in the switch, with the toggle extending through an opening in the template.

When the template is in position over an electrical outlet box the wall panel is put in its proper orientation with respect to the installed wall panels, and it is pressed up against the template, thereby transferring the location of the four posts to the reverse side of the panel. The points can be connected to produce an outline of the electrical circuit box.

One advantage of the invention is that the paneling template can be used in connection with either an electrical switch or an electrical receptacle.

Another advantage of this invention is that the template lies flat against the wall when used in connection with an electrical outlet box and thereby makes it possible to more accurately mark the position of the electrical outlet box on the reverse side of the paneling.

Another advantage of the invention is that the template can be used with electrical outlet boxes of various sizes.

Another advantage of the invention is that the template is constructed of a non-conductive plastic copolymer such that it can be used in electrical outlet boxes without turning off the power or removing the electrical switches or electrical socket plugs from the box.

Another advantage of the invention is that it can be used with virtually any type of wall covering including paneling and drywall and even plastic laminate, which is used in kitchen counter backsplashes.

Another advantage of the invention is that the marking means for the template requires a minimum amount of chalk or ink and pressure in order to transmit the mark on the paneling.

DETAILED DESCRIPTION OF PREFERRED EMBODIMENT

Figure 1:
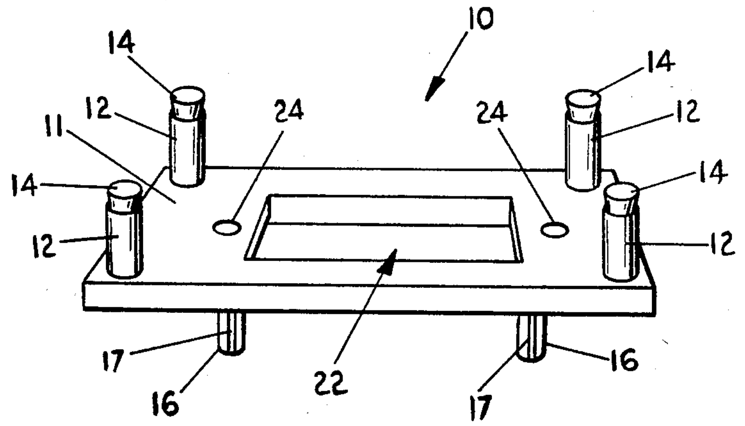
FIG. 1 is a perspective view of the template.
Figure 7:
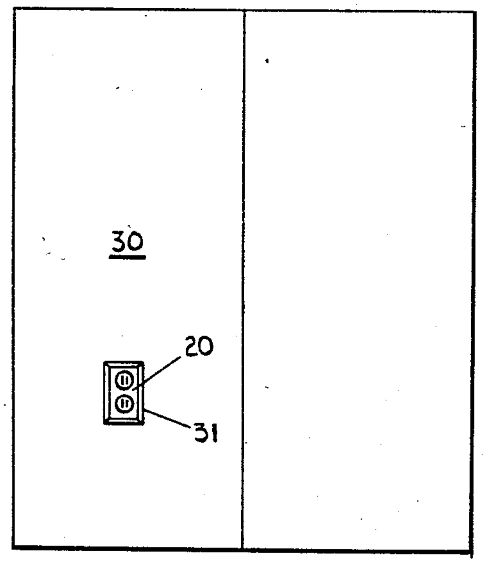
FIG. 7 is a view of the paneling installed on the wall after an access hole is cut therein for an electrical plug receptacle.
Figure 3:
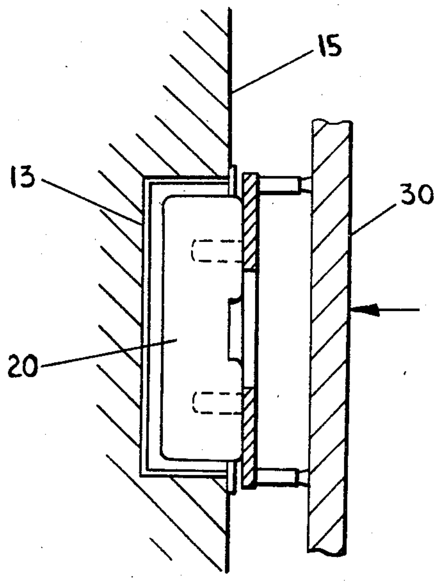
FIG. 3 is a partially sectional side view of the template fully inserted into an electrical plug receptacle, with paneling pressed up against the template.
Figure 4:
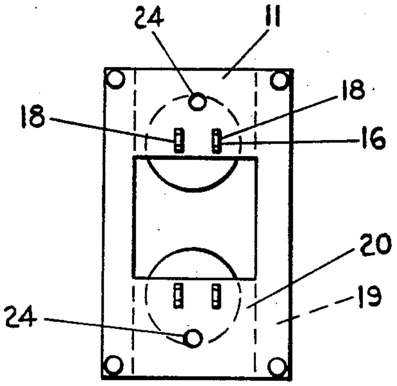
FIG. 4 is a front view of the template when inserted into an electrical plug receptacle.

As shown in FIG 1, a paneling template 10 has a generally flat and rectangular body 11 that conforms to the shape of an electrical outlet box 13 mounted in a wall 15 (FIG. 3). Raised reinforced edges 19 extend along the inward side of the template (i.e., the side facing the wall). The template 10 is integrally molded in one piece from a non-conducting plastic co-polymer so that the electrical power does not have to be turned off to mount the template on or over the electrical switch or electrical plug receptacle.

Figure 2:
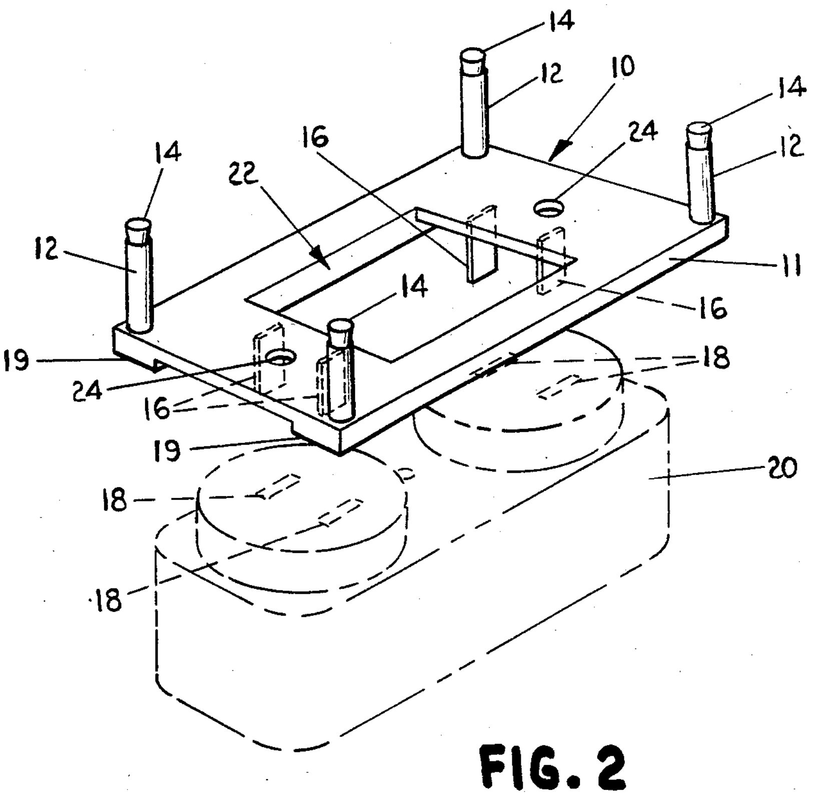
FIG. 2 is a perspective view showing the template about to be inserted into an electrical plug receptacle.

Posts 12 are located at the four corners of the template's upper surface. Felt tips 14 are permanently affixed or bonded by an adhesive to the top of posts 12 for receiving ink, chalk, or any other suitable marking media. Flat prongs 16 protrude from the underside of template 10 and are located such that they can be inserted into the plug slots 18 of an electrical plug receptacle 20 as shown in FIG. 2. Ridges 17 (FIG. 1) extend longitudinally along the sides of the prongs 16 and provide a tighter fit between the prongs and the plug slots.

Figure 5:
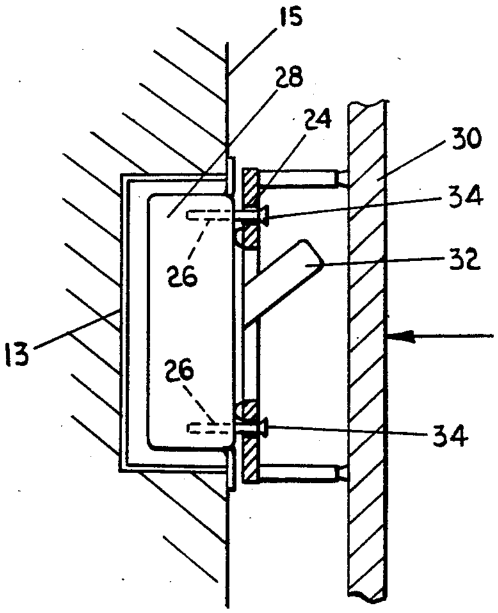
FIG. 5 is a partially sectional side view of the template positioned over an electrical switch with the paneling pressed up against the template.

Located in the middle of template 10 is electrical switch opening 22. Screw apertures 24 are located on both sides of the electrical switch opening 22 to match the threaded switch plate screw openings 26 that are in a standardized position in electrical switch 28 (FIG. 5).

When used with an electrical plug receptacle 20, prongs 16 are inserted into slots 18 of receptacle 20 as shown in FIG. 3. A suitable marking medium, such as ink or chalk, is applied to felt tips 14. A wall panel 30 is then placed against the wall in the position in which it will be installed. When the wall panel 30 is placed in its proper position, it will also be butted up against felt tips 14. The wall panel 30 is then taken away and four marks will be found on its reverse side indicating the outline of the electrical outlet box.

Figure 6:
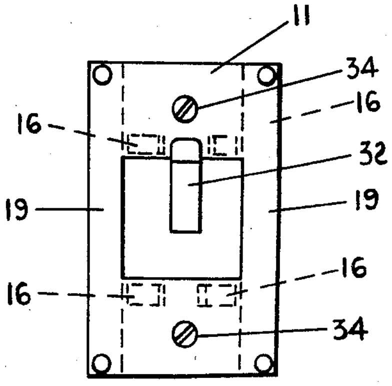
FIG. 6 is a front view of the template when positioned on an electrical switch.

As shown in FIG. 6, when used with a wall switch 28, prongs 16 are bent outwardly and fit within raised side edges 19, such that the main portion of the prong lies parallel to and almost flat against the underside of template 10. This can be done repeatedly without fear of weakening or breaking off the prongs, as template 10 is constructed out of a resilient plastic resin (preferably a co-polymer) that has a high flex life. The preferred material is the same type used in connection with what is commonly referred to as a "living hinge". Bending the prongs 16 outwardly, the template is placed against the outlet with the toggle 32 of electrical switch 28 protruding through the electrical switch opening 22. Template 10 is then secured to electrical switch 28 by inserting screws 34 into screw apertures 24 of the template, and into the screw receiving apertures 26 of electrical switch 28. A suitable marking media is then applied to felt tips 14 and wall panel 30 is placed in the desired position on the wall. In so placing wall panel 30, its reverse side comes into contact with the four felt tips 14, and the marking media is transmitted to the reverse side of panel 30, leaving an outline of the desired access opening 31 thereon. The dots are then connected to provide a cutting outline on the back side of the panel.

While there have been shown and described preferred embodiments of the invention, it is understood that various changes in materials and shapes of marking members may be made by those skilled in the art without departing from the spirit of the invention.

I claim:

1. A template for marking the position of an electrical outlet box on the reverse side of wall paneling, said template being formed of non-conductive material and comprising:

a base;

raised protrusions on the outer side of the base and positioned to form the corners of a rectangle conforming to the size of the desired opening in the wall paneling for the outlet box, said protrusions including marking tip means thereon for marking the positions of the protrusions on the back of a panel pressed against the template;

a plurality of prongs protruding inwardly from the inner side of the base and being shaped and positioned to fit into the plug slots in an electrical plug receptacle, said prongs being resilient and flexible such that they can be bent over and out of the way, such that the template can be placed flush to the wall over an electrical switch;

an electrical switch opening located in the middle of the template through which the toggle of an electrical switch can be placed; and at least one screw aperture extending through the base in line with a threaded switch plate screw opening in the switch, such that the template can be affixed to an electrical switch by a threaded fastener extending through the screw aperture into threaded engagement with the switch plate opening in the switch.

2. A template according to claim 1 wherein the template is integrally formed of a resilient plastic resin, with the prongs being sufficiently thin and the resin sufficiently resilient and flexible that the prongs can be bent over repeatedly without breaking off, the marking tip means being affixed to the ends of the protrusions and comprising separate resilient absorbent tips capable of retaining chalk or ink.

3. A template according to claim 2 wherein the base is rectangular and the protrusions are posts extending outwardly from corners of the base, the marking tips comprising felt tips bonded to the ends of the posts, the template comprising a pair of screw apertures that mate with standard threaded switch plate screw openings in an electrical switch.

4. A template according to claim 3 wherein the prongs fit snugly into the plug slots in an electrical plug receptacle, the prongs being generally flat and having longitudinally extending ridges on the sides to enhance the snugness of the prong fit in the receptacle openings.

* * * * *